United States Patent [19]

Koide

[11] Patent Number: 5,201,051
[45] Date of Patent: Apr. 6, 1993

[54] APPARATUS FOR INTERRUPT DETECTION AND ARBITRATION

[75] Inventor: Katsuyoshi Koide, Tokyo, Japan
[73] Assignee: Oki Electric Industry Co., Ltd., Tokyo, Japan
[21] Appl. No.: 590,699
[22] Filed: Oct. 1, 1990
[30] Foreign Application Priority Data Oct. 5, 1989 [JP] Japan ................. 1-258742

[51] Int. Cl.$^5$ .................. G06F 13/14; G06F 13/368
[52] U.S. Cl. ................... 395/725; 395/325; 364/242.93; 364/DIG. 1; 364/937.01; 364/941; 364/DIG. 2
[58] Field of Search ............. 395/725, 325; 364/DIG. 1, 242.93, 937.01, 941, DIG. 2

[56] References Cited

U.S. PATENT DOCUMENTS 4,365,294 12/1982 Stokken ................... 395/325
4,494,192 1/1985 Lew et al. ................ 395/325
4,608,631 8/1986 Stiffler et al. ........... 395/325
4,716,523 12/1987 Burrus, Jr. et al. ....... 395/425
4,870,566 9/1989 Cooper et al. ............ 395/325

Primary Examiner—Michael R. Fleming
Assistant Examiner—Glenn A. Auve
Attorney, Agent, or Firm—Spencer, Frank & Schneider

[57] ABSTRACT

An apparatus for interrupt detection and arbitration in a system which includes a plurality of circuit modules connected to each other by a common bus line is disclosed. According to the present invention, within two bus cycles, it is possible for any interrupt source circuit modules to notify an arbitrated interrupt destination module directly, with a relatively low load being imposed on the CPUs in those circuit modules. An interrupt detector/arbiter circuit is provided in each of the circuit modules, and a central controller circuit is provided in the CPU module. The interrupt detector/arbiter circuits are assigned to corresponding bus lines and transfer the necessary interrupt information, such as the interrupt destination or the interrupt sources, by signals on the bus lines which correspond to the destination or source interrupt detector/arbiter circuits.

3 Claims, 9 Drawing Sheets

APPARATUS FOR INTERRUPT DETECTION AND ARBITRATION

BACKGROUND OF THE INVENTION

1. Field of the Invention

This invention relates to an apparatus for interrupt detection and arbitration utilized in a system which comprises a plurality of processing circuit modules (including a CPU module) connected to each other by bus lines.

Further, this invention relates especially to an apparatus which detects a plurality of interrupts from a plurality of interrupt source circuit modules, arbitrates a single interrupt destination circuit module, and notifies the interrupt destination circuit module of the plurality of interrupts utilizing two bus cycles.

2. Brief Description of the Related Art

Recently, non-synchronized networks or distributed processing systems have been utilized in the data communication technology field. One of the most advantageous points of those systems is efficient throughput because of the independence of each processing unit.

FIG. 1 illustrates a general block diagram of a typical example of a conventional distributed data base system 2, which mainly comprises a host computer 4, a memory disk system 6 connected thereto, and two terminal controllers 10a and 10b connected to the host computer 4 via communication lines 8a and 8b respectively.

Further, the terminal controllers 10a and 10b are connected to a distributed processing unit 12 having a local disk unit 18 for processing local processing jobs commonly via communication lines 14a and 14b.

Each of the terminal controllers 10a and 10b has a local area network 16a or 16b respectively. In the local area network 16a, assume that there are n (n; integer, n>2) terminal units, 20-1, 20-2, ... 20-n and in the local area network 16b, assume that there are m (m; integer, m>2) terminal units 22-1, 22-2, ... 22-m.

As mentioned above, to realize a high total throughput of the system, some circuit modules in the system, such as terminal controllers 10a, 10b, the distributed processing unit 12, and the terminal units 20-n and 22-m, need independence of processing functions. Therefore, generally, the internal operations of such circuit modules are managed by means of a circuit structure (or a software structure) that is called an "interrupt driven structure" or an "event driven structure".

The terminal unit 20-1 will now be discussed as a typical example to explain the details of conventional interrupt detection and arbitration in circuit modules having the "interrupt driven" or "event driven" structure.

FIG. 2 illustrates a general block diagram of the terminal unit 20-1 illustrated in FIG. 1. The terminal unit 20-1 comprises several conventional circuit modules, such as a bus control module 24, a CPU module 28, a communication control module 30 connected to the network 16a via a communication line 31, a memory module 32, an I/O control module 34 connected to a keyboard 39 and a display 37, and a disk control module 36 connected to a local disk unit 38.

Those circuit modules ar connected each other by a bus 26 and are self-controlled by at least one control circuit, such as a microcomputer or a sequencer unit, included in each circuit module. Further, some circuit modules have memory or register circuits accessible by such control circuit for storing control data or programs for self control.

These circuit modules perform, for example, the following functions:

(1) The communication control module 30 watches the status of the communication line 31. If the communication control module 30 detects a communication data (not shown) on the communication line 31, the communication control module 30 receives the communication data and stores it in a communication buffer (not shown) therein. Assume that the communication data carried on the local network 16a is comprised of signaling data which includes a terminal identification or error correction parity data and substantive data which will be utilized in application software executed by the terminal unit 20-1 itself.

(2) The communication control module 30 analyzes the received communication data. The terminal unit 20-1 has a predetermined identification, and if the signaling data in the received communication data has the same destination identification as the predetermined identification of the terminal unit 20-1, the communication control module 30 disassembles the received communication data to the signaling data and the substantive data. Further, the communication control module 30 performs error correction using the signaling data to verify the obtained substantive data.

(3) After verification, the communication control module 30 transfers the substantive data to a predetermined address of the memory module 32 in it predetermined bus transfer cycle. After that, the communication control module 30 notifies the CPU module 28 of the existence of the substantive data in the memory module 32 by means of an interrupt to the CPU module 28.

(4) When the CPU module 28 detects the interrupt, the CPU module 28 recognizes which module interrupted and conducts a predetermined procedure as to the transferred substantive data at the predetermined address in the memory module 32.

(5) The CPU module 28 executes the predetermined procedure as to the substantial data under the control of the application program in the terminal unit 20-1, and generates reply data, if necessary. The CPU module 28 stores the reply data at another predetermined address in the memory module 32 and notifies the communication control module 32 of the existence of the reply data by an interrupt to the communication control module 30.

(6) The communication control module 30 detects the interrupt and analyzes the destination of the interrupt. If it is for the communication control module 30, the communication control module 30 reads the reply data via the bus 26 in another predetermined bus cycle.

(7) Further, the communication control module 30 adds signaling data or error correction parity data to the reply data and generates another communication data for the reply. The communication control module 30 then sends the communication data to the network via the communication line 31.

To accomplish the above mentioned functions (1)–(7), these circuit modules feature the following hardware and operations for interrupt detection and arbitration.

For easy understanding, FIG. 3 will be used to explain the conventional circuit structure for interrupt detection and arbitration. FIG. 3 has been abstracted from FIG. 2. As shown in FIG. 3, each circuit module has a predetermined unique ID (identification) number, for example, #0, #1, #2, . . . #n, and is connected to the other circuit modules by bus 44, which corresponds to the bus 26 in FIG. 2. A circuit module 42, which has the ID number #0, corresponds to the CPU module 28 in FIG. 2 and the other circuit modules 48-1, 48-2, . . . and 48-j correspond to the other circuit modules in FIG. 2.

In this example, suppose that the circuit module 48-1 corresponds to the communication control module 30 and the circuit module 48-2 corresponds to the memory module 32. Each of circuit modules of 48-1 to 48-j has a respective interrupt line 46-1 to 46-j to notify the circuit module 42 (CPU module) of an interrupt request. The circuit modules of 48-1 to 48-j generate interrupt request signals independently, and also the circuit module 42 (#0) performs its own job independently because the circuit module 42 corresponds to CPU module 28.

If one of the circuit modules, for example, circuit module 48-1 (#1), has a job in the circuit module 48-2 (#2) which is to be executed by the circuit module 42 (#0), the circuit module 48-1 generates an interrupt request signal on the interrupt line 46-1 and puts address data of the job in the circuit module 48-2 in a predetermined register (not shown).

Since the circuit module 42 (#0) can accept only one interrupt request at one time, if the interrupt request is the first interrupt request, it will be accepted. If one of the other circuit modules' interrupts has been accepted, the circuit module 42 (#0) masks other interrupts and the interrupt request signal by the circuit module 48-1 won't be accepted until the completion of the job caused by the other interrupts.

When the circuit module 42 detects the interrupt request signal from the circuit module 48-1 via the interrupt line 46-1, the circuit module 42 reads out the contents of the predetermined register (not shown) in the circuit module 48-1 via the bus 44 and analyzes the contents of the register. After the circuit module 42 recognizes the contents as address data of the circuit module 48-2, the circuit module 42 executes the job at the address in the circuit module 48-2 in a predetermined execution cycle. After completion of the job, the circuit module 42 can accept another interrupt request.

However, the above mentioned conventional system has the following disadvantages.

The number of the interrupt lines depends on the number of the circuit modules. Therefore, it is very difficult to add or delete circuit modules from the system (bus). In other words, a user cannot modify or add new functions to the system since the system is not flexible.

Further, since the CPU module always arbitrates all of the interrupts in the conventional system, the detection and arbitration of the interrupts depends only on the processing power of the CPU module. Therefore, a circuit module cannot make an interrupt request directly to a circuit module other than the CPU module. Further, direct notification of an interrupt from one circuit module to the other circuit module is impossible.

OBJECTS AND SUMMARY OF THE INVENTION

An object of the present invention is to provide an apparatus for interrupt detection and arbitration which can equalize the CPU module and the other circuit modules. In other words, in the system of the present invention, any circuit module, including the CPU module, can directly notify any other module of an interrupt.

Further, another object of the present invention is to provide an apparatus for interrupt detection and arbitration which reduces the processing load of the CPU module.

A further object of the present invention is to provide an apparatus for interrupt detection and arbitration which makes adding or deleting circuit modules relatively easy.

To realize the above mentioned objects, in a system which comprises a plurality of processing circuit modules, each of which has a unique identification, connected to each other by a common bus, the present invention provides a plurality of interrupt detector/arbiter circuits, one in each of the circuit modules, and further provides a central controller circuit in the CPU module of the system.

The interrupt detector/arbiter circuits and the central controller circuit provide an interrupt transfer cycle among the usual bus cycles which consists of an interrupt destination notifying cycle for arbitrating in each of the circuit modules to select a single destination circuit module and a succeeding interrupt source notifying cycle for notifying which circuit modules have made interrupts to the destination circuit module.

Each of the circuit modules can make an interrupt independently and transfer the interrupt information on the common bus. The central controller circuit in the CPU module detects the interrupt information on the common bus and starts an interrupt destination notifying cycle, and further, enables the interrupt detector/arbiter circuit to specify an assigned line in the common bus which corresponds to an interrupt destination circuit module. Further, in the interrupt destination notifying cycle, the interrupt detector/arbiter circuits in all of the circuit modules latch the status of the common but to detect the specified lines and their corresponding interrupt destination circuit modules. The interrupt detector/arbiter circuits arbitrate the destination circuit module. If a circuit module has requested an interrupt, the result of the arbitration is compared with requested the interrupt destination circuit module's identification.

If the arbitrated interrupt destination circuit module's identification and the requested destination circuit module's identification are the same ("true"), the interrupt detector/arbiter circuit starts the interrupt source notifying cycle.

In the interrupt source notifying cycle, each of the circuit modules whose results of the comparison are "true", specifies an assigned signal line among the common bus which corresponds to the self circuit module identification. Such circuit modules are the interrupt source modules.

Further, in the interrupt source notifying cycle, the interrupt detector/arbiter circuit in the destination circuit module compares the self circuit module identification and the result of the arbitration and recognizes that it, the destination circuit module, has received interrupts from the interrupt source circuit modules.

Further, at the end of the interrupt source notifying cycle, the destination circuit module latches the status of the common bus and further recognizes which circuit modules are the interrupt source circuit modules by analyzing the status of the corresponding signal lines.

After that, the destination circuit module can conduct the necessary process, for example, for data transfer from the interrupt source circuit modules by the DMA method and the like.

BRIEF DESCRIPTION OF THE DRAWINGS

These and other features and advantages of the invention may be more completely understood from the following detailed description of the preferred embodiments of the invention with reference to the accompanying drawings in which.

DESCRIPTION OF THE PREFERRED EMBODIMENT

(Circuit Structure)

Figure 1:
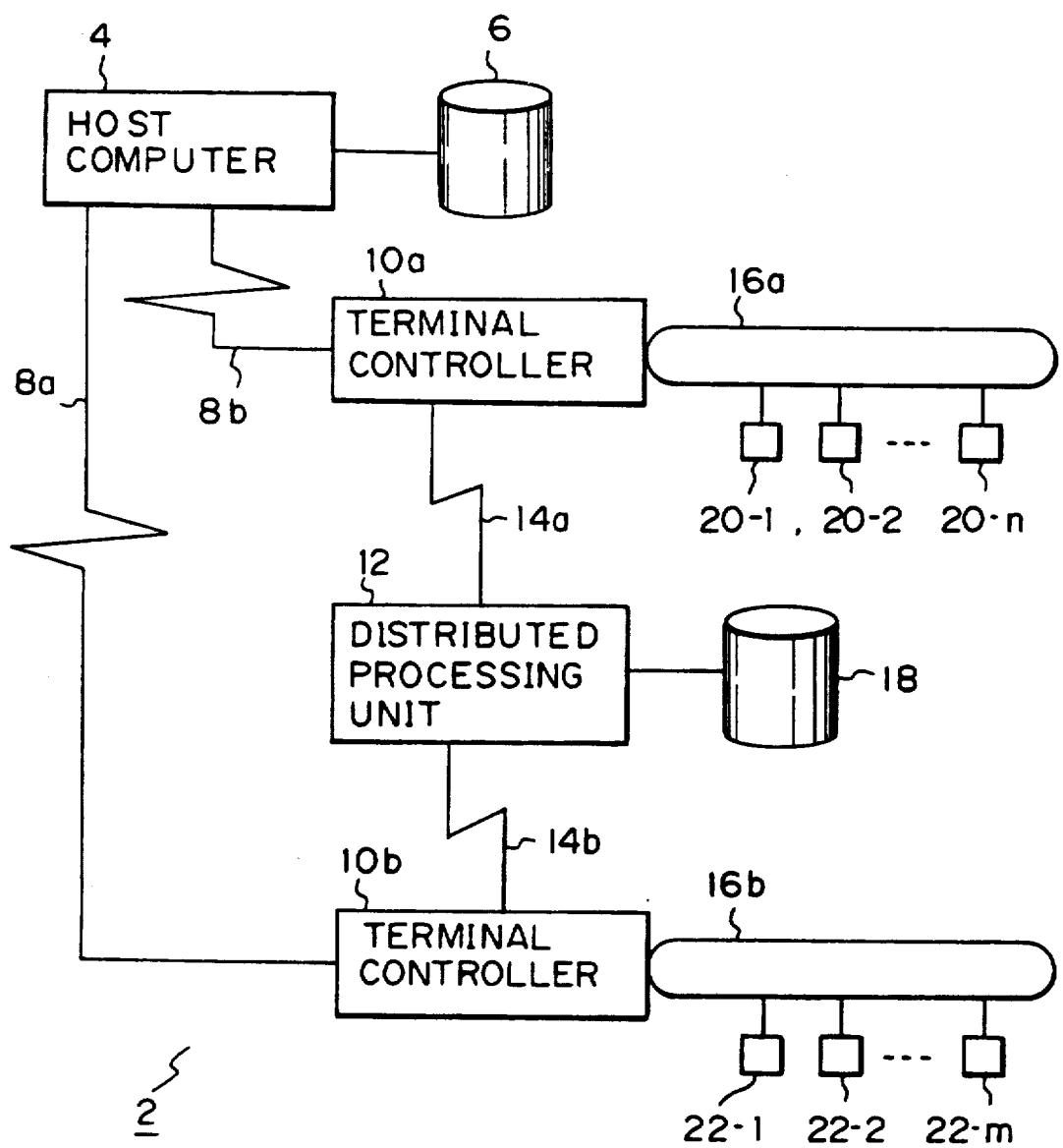
FIG. 1 illustrates an example of a conventional distributed data base system.
Figure 2:
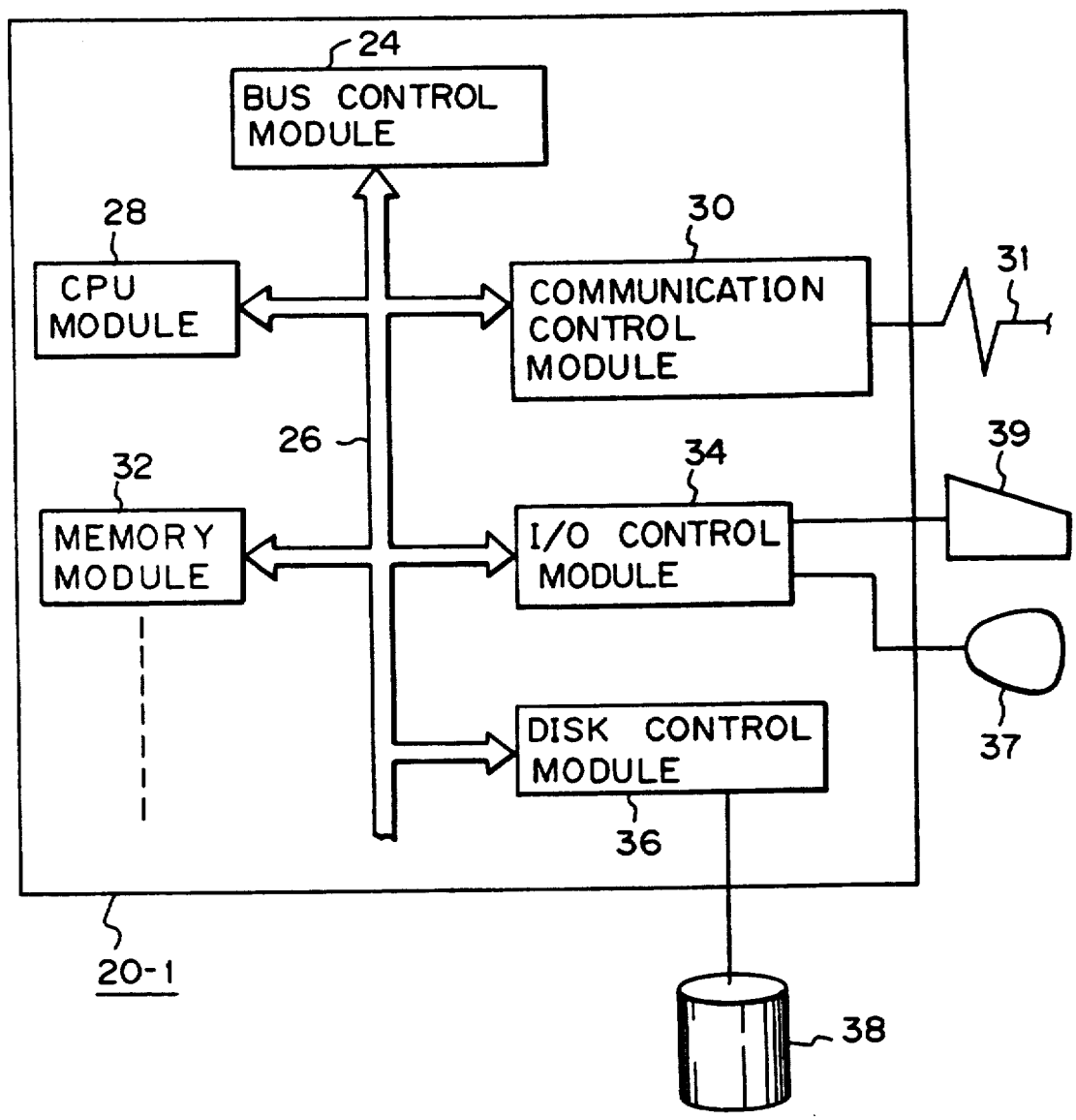
FIG. 2 illustrates a general block diagram of the terminal unit 20-1 illustrated in FIG. 1.
Figure 3:
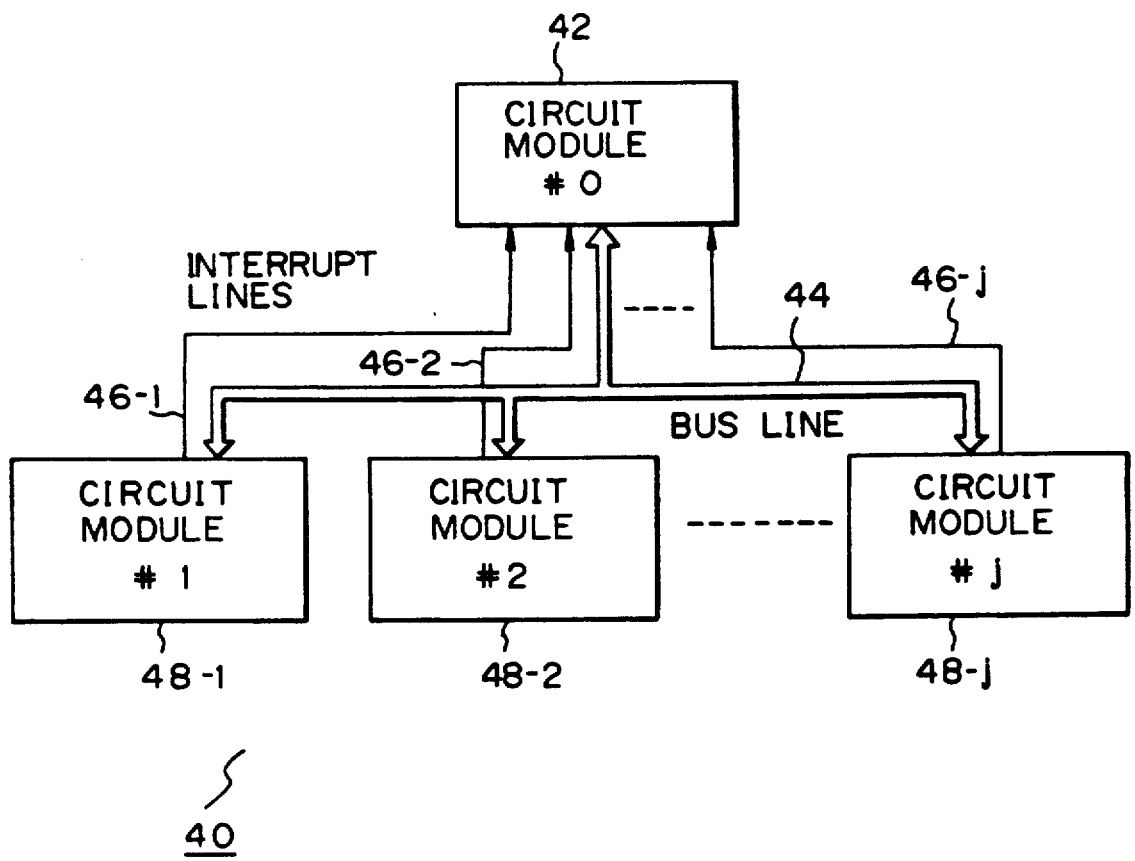
FIG. 3 is an abstracted drawing for explaining conventional interrupt detection and arbitration in th terminal unit illustrated in FIG. 2.

An example of a terminal unit to which the present invention is applied will be explained first. Such a terminal unit has substantially the same block diagram as the conventional terminal unit 20-1 disclosed in FIG. 2. However, each circuit module has a different circuit structure.

Figure 4:
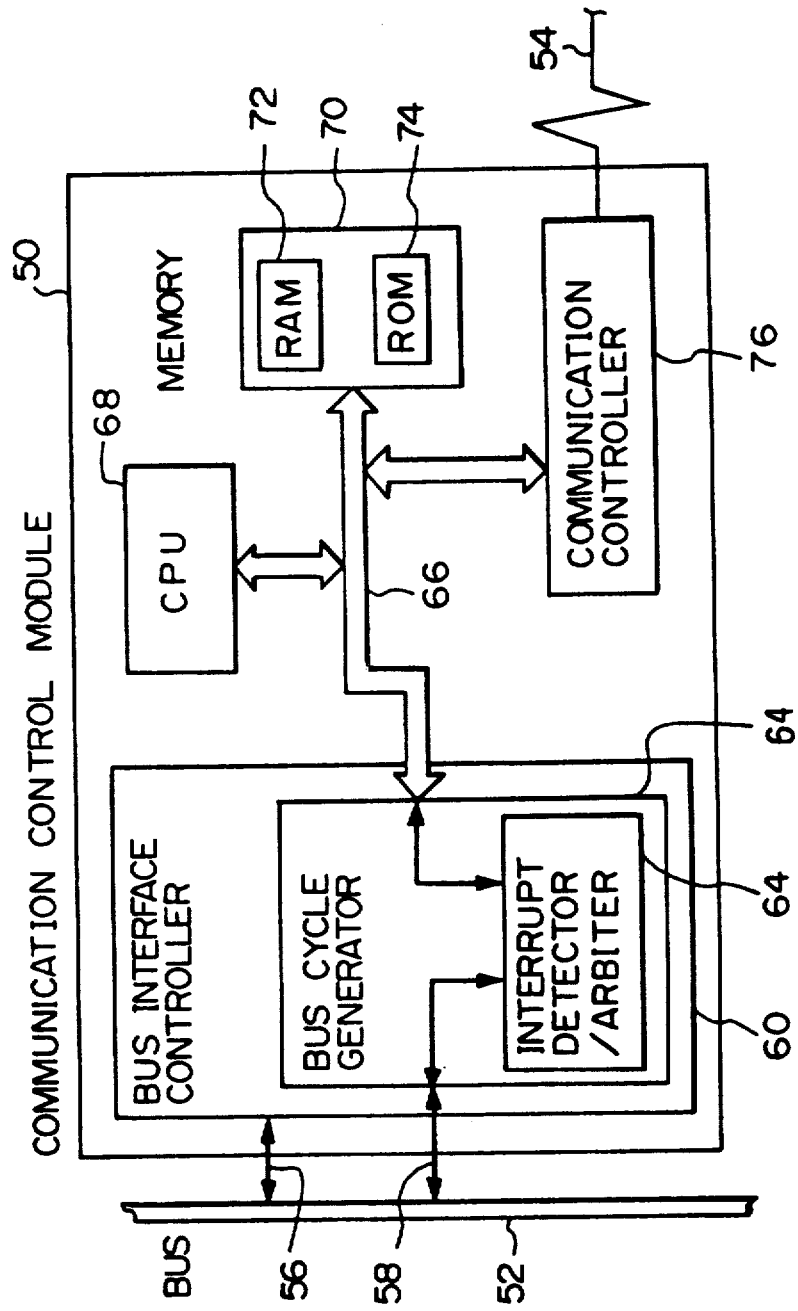
FIG. 4 illustrates a general block diagram of a communication control module in which the present invention is applied.

FIG. 4 illustrates a general block diagram of a communication control module 50 to which the present invention is applied. The communication control module 50 mainly comprises a conventional communication controller 76, such as an MB89372 IC made by Fujitsu Ltd., a conventional microcomputer (hereinafter, CPU) 68, such as an 80C186 microprocessor made by Intel Co., a conventional memory 70 including RAM 72 and ROM 74, and a bus interface controller 60.

Those circuits are connected to each other by an internal bus 66. Further, the communication control module 50 itself is connected to a bus 52 via communication lines 56, 58.

An essential point of the present invention is to provide an interrupt detector/arbiter circuit 64 in a bus cycle generator 62 in the bus interface controller 60. The detailed circuit structure of the interrupt detector/arbiter circuit 64 will be explained later. Of course, the "bus interface controller" and the "bus cycle generator" are defined by those functions and there are a lot of conventional such circuits in this technical field.

Figure 5:
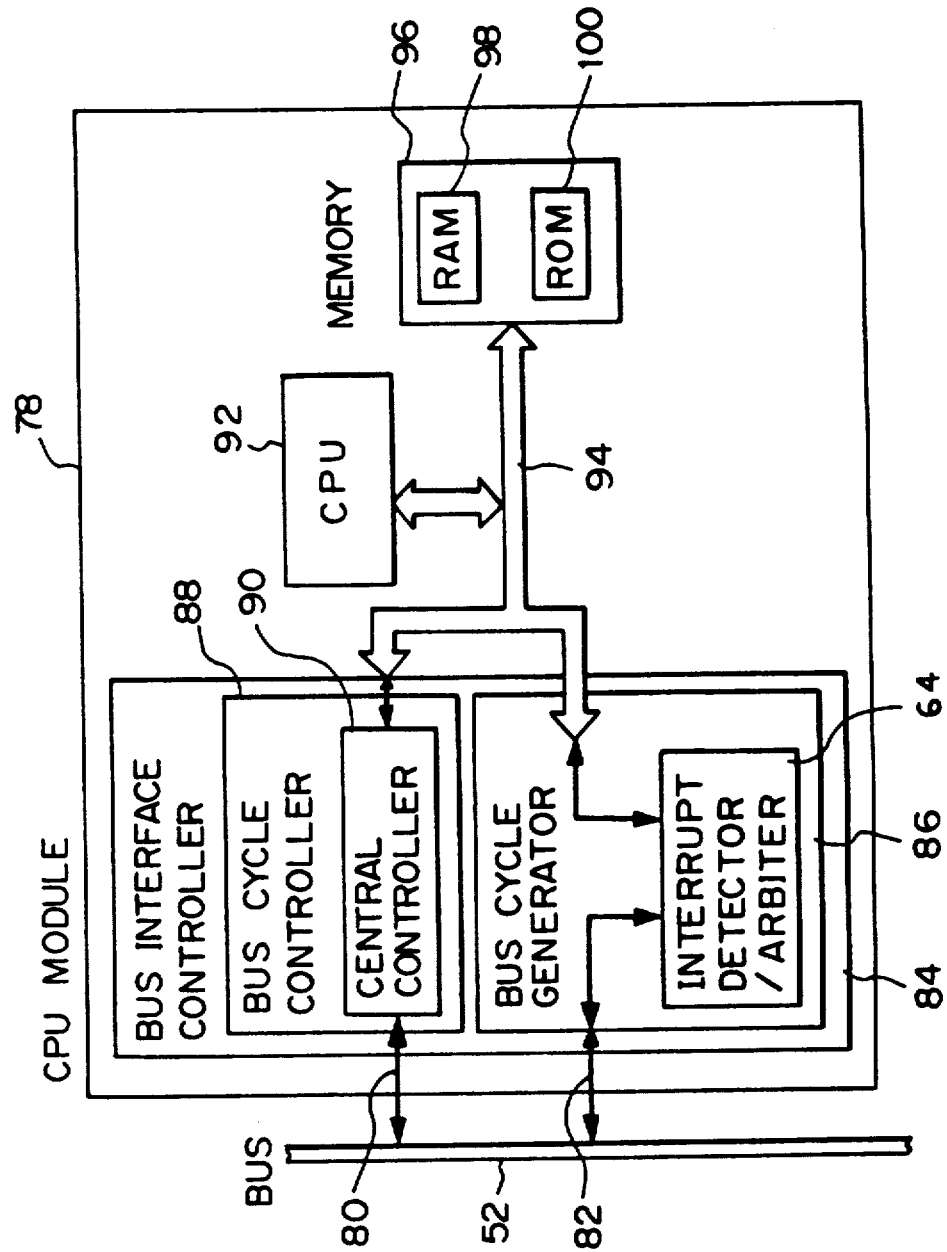
FIG. 5 illustrates a general block diagram of a CPU module in which the present invention is applied.

FIG. 5 illustrates a block diagram of a CPU module 78 to which the present invention is applied. The CPU module 78 comprises a conventional CPU 92, such as an 80286 CPU made by Intel Co., a memory circuit 96 which includes a RAM 98 and a ROM 100, and a bus interface controller 84. The CPU module 78 itself is connected to the bus 52, which is connected to the communication control module 50 in FIG. 4, via communication lines 80 and 82.

In the bus interface controller 84, there is also an interrupt detector/arbiter circuit 64, in a bus cycle generator 86, which has the same circuit structure of the interrupt detector/arbiter circuit 64 disclosed in FIG. 4. A further essential point of the present invention is to provide a central controller circuit 90 in a bus cycle controller 88 in the bus interface controller 84. The central controller circuit 90 conducts interrupt management instead of the CPU 92 to reduce the load on the CPU 92.

The circuit structure of the central controller 90 and the relation between the interrupt detector/arbiter 64 and the central controller circuit 90 will be explained later.

Additionally, the "bus cycle controller" 88 is defined by a function which is conventional in the bus interface controller 84 and there are a lot of conventional circuits in this technical field.

Figure 6:
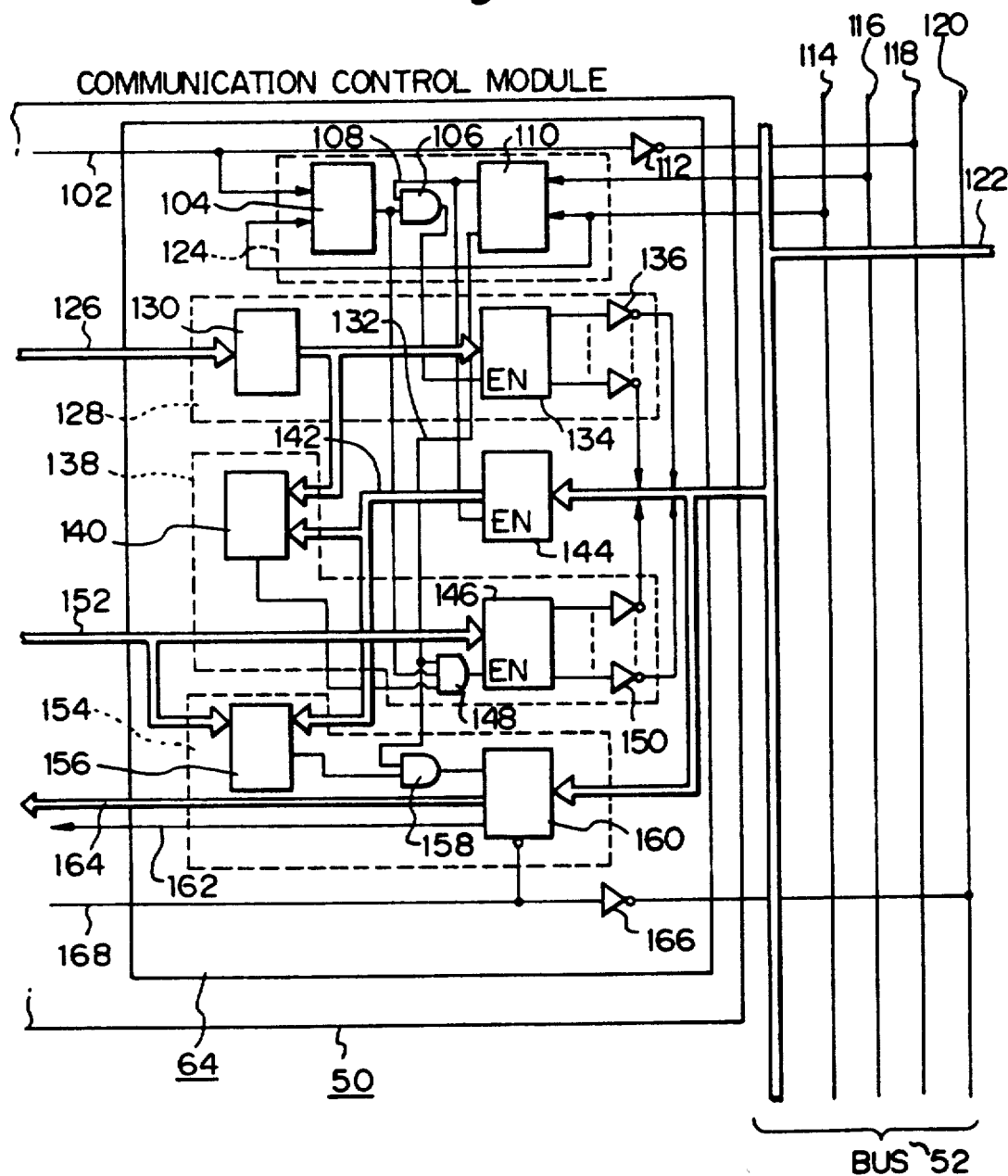
FIG. 6 is a detailed circuit diagram of an interrupt detector/arbiter circuit provided in the communication control module.
Figure 7:
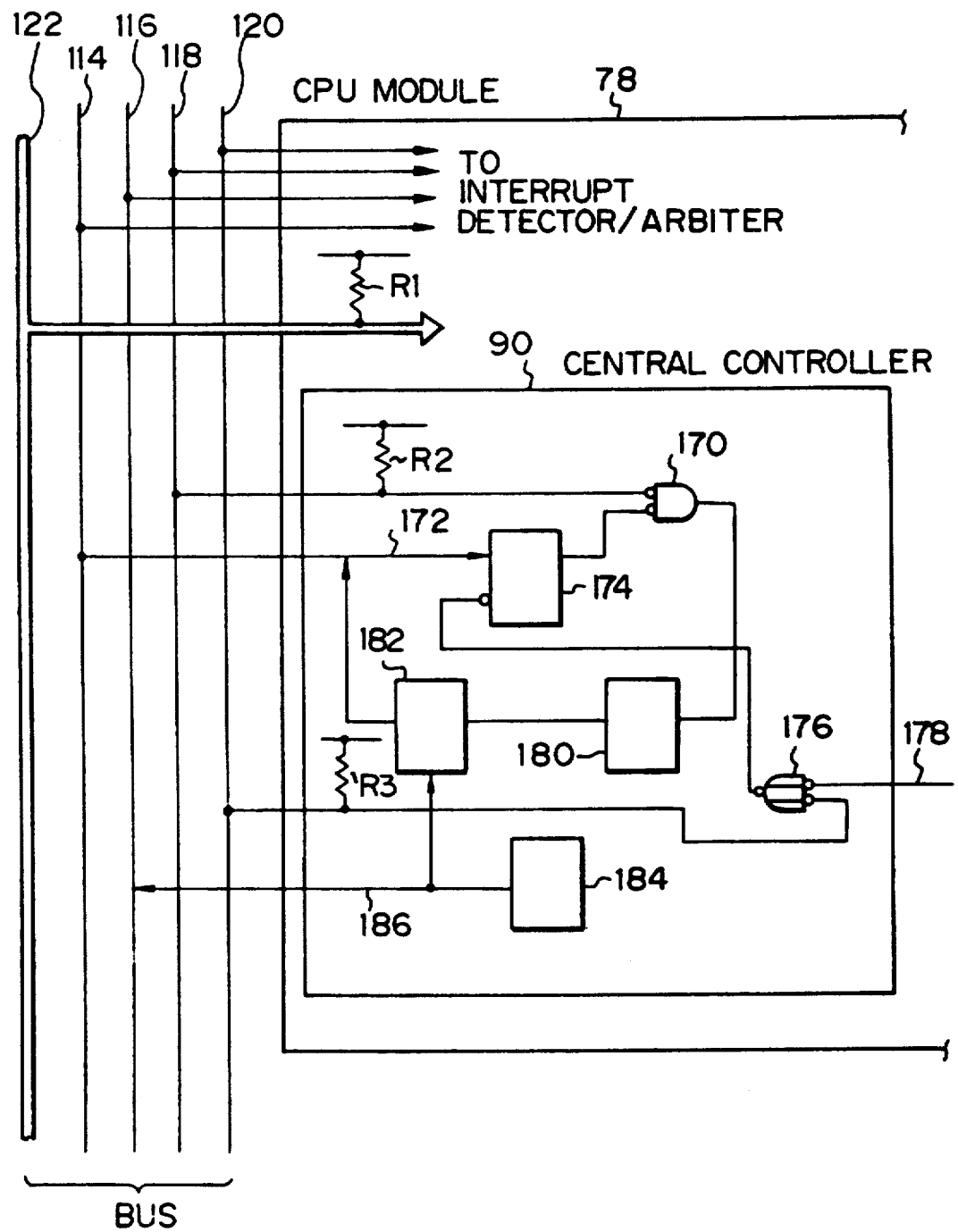
FIG. 7 is a detailed circuit diagram of a central controller circuit provided in the CPU module.

FIG. 6 is a detailed circuit diagram of the interrupt detector/arbiter circuit 64 provided in the communication control module 50 disclosed in FIG. 4. FIG. 7 is a detailed circuit diagram of the central controller circuit 90 disclosed in FIG. 5. The detailed circuit structure and functions of the present embodiment will now be explained using FIGS. 6, 7 and their timing chart illustrated in FIG. 8.

As shown in FIG. 6, the interrupt detector/arbiter circuit 64 mainly comprises four circuit blocks: a cycle divider circuit block 124, an interrupt destination module number output circuit block 128, an interrupt source module number output circuit block 138, and an interrupt receiving circuit block 154.

In the cycle divider circuit block 124, an interrupt signal line 102 (one of the lines of the internal bus 66 shown in FIG. 4) is connected to the CPU 68 of FIG. 4. When the CPU 68 needs to make an interrupt, the CPU 68 drives an output gate 112 via the interrupt signal line 102. The output of the output gate 112 is connected to a common interrupt signal line 118. The common interrupt signal line 118 is included in the bus 52, which further comprises a data/address bus 122, a common control signal line 114, a common bus clock line 116, and a common interrupt reset signal line 120.

The cycle divider circuit block 124 comprises an interrupt signal holder circuit 104, an AND gate 106, and an interrupt transfer cycle detector circuit 110. The interrupt signal holder circuit 104 and the interrupt transfer cycle detector circuit 110 could be comprised of several desired conventional logic gate circuits.

The interrupt destination module number output circuit block 128 comprises an interrupt destination module number holder circuit 130, an interrupt destination module number decoder circuit 134, and a plurality of output gates 136. The interrupt destination module number holder circuit 130 and the interrupt destination module number decoder circuit 134 could be comprised of several desired conventional logic gate circuits.

The interrupt source module number output circuit block 138 comprises an interrupt source module number comparing circuit 140, an AND gate 148 having three input ports, an interrupt source module number decoder circuit 146, and a plurality of open collector type output gates 150. The interrupt source module number comparing circuit 140 and the interrupt source module number decoder circuit 146 could be comprised of several desired conventional logic gate circuits.

The interrupt receiving circuit block 154 comprises an interrupt destination module comparing circuit 156, an AND gate 158, and an interrupt source module number latch circuit 160. The interrupt destination module comparing circuit 156 and the interrupt source module number latch circuit 160 could be comprised of several desired conventional logic gate circuits.

An output gate 166 transfers an interrupt reset signal from the CPU 68 via an interrupt reset signal line 168. The output signal of the output gate 166 is applied to the common interrupt reset signal line 120. The common interrupt reset line is also connected to an input of the OR gate 176 in FIG. 7.

In the interrupt detector/arbiter circuit 64, an interrupt signal from the CPU 68 comes to the common interrupt signal line 118 via the output gate 112. The interrupt signal then goes from line 118 through the AND gate 170 in the CPU module 78 in FIG. 7.

In FIG. 7, the CPU module 78 includes another interrupt detector/arbiter circuit (not shown) which has the same circuit structure disclosed in FIG. 6 and the central controller circuit 90. The central controller circuit 90 mainly comprises an interrupt transfer cycle request mask circuit 174, the AND gate 170, an interrupt transfer cycle request circuit 180, a cycle generator circuit 182, an OR gate 176, and a bus clock generator circuit 184.

The contents of these circuit blocks, such as the interrupt transfer cycle request mask circuit 174, the interrupt transfer cycle request circuit 180, and the bus clock generator circuit 184, could be comprised of several desired conventional logic gate circuits.

The other input of the AND gate 170 comes from the interrupt transfer cycle request mask circuit 174 via the common control signal line 114. Further, the output of the AND gate 170 goes to the cycle generator circuit 182 via the interrupt transfer cycle request circuit 180. The output of the cycle generator circuit 182 goes to the common control signal line 114 and to the other input of the interrupt cycle request mask circuit 174.

By way of the common control signal line 114, the output of the cycle generator circuit 182 goes to an input of the interrupt transfer cycle detector circuit 110 and an input of the interrupt signal holder circuit 104 (see FIG. 6). Note that the common control signal line 114, the common interrupt signal line 118, the data/address bus 122, and the common interrupt reset signal line 120 are driven by negative logic. Therefore, on those signal lines, "ON" means a "L"ow or a "O" level signal.

In the central controller circuit 90, the other input of the interrupt transfer cycle request mask circuit 174 is connected to the output of the OR gate 176. The OR gate resets the interrupt transfer cycle request mask circuit 174 in response to an internal reset signal from a internal reset signal line 178 or an interrupt reset signal from the common interrupt reset signal line 120. As mentioned above, the common interrupt reset signal line 120 is driven at negative logic; therefore, the input connected to the common interrupt reset signal line 120 is pulled up by a pull-up resistor R3.

The bus clock generator circuit 184 in the central controller circuit 90 provides a bus clock signal. The bus clock signal from the clock generator circuit 184 goes to the other input of the interrupt transfer cycle detector circuit 110 (FIG. 6) via the common bus clock signal 116.

The interrupt transfer cycle detector circuit 110 responds to the bus clock signal on the common bus clock signal line 116 and an input signal from the common control signal line 114, and outputs an interrupt destination module notifying signal on its output line 108. Interrupt transfer cycle detector circuit 110 also outputs an interrupt source module notifying signal on its output line 132.

The interrupt destination module notifying signal o the signal line 108 is further applied to an enable input EN of an interrupt destination module number arbitration circuit 144. The interrupt destination module number arbitration circuit 144 could be comprised of several desired logic gates.

The AND gate 106 receives the interrupt destination module number notifying signal via the signal line 108, and further, receives the output of the interrupt signal holder circuit 104.

When the CPU 68 makes an interrupt, the CPU 68 outputs a destination module number to the interrupt transfer module number holder circuit 130 via parallel signal lines 126. In this embodiment, each of the circuit modules is assigned a fixed, unique identification numbers (module ID number).

The interrupt destination module number is transferred to the interrupt destination module number decoder circuit 134 and decoded to select a single output gate among the plurality of the output gates 136. Each of the output gates 136 is assigned to a corresponding data line among the data/address bus 122. Therefore, a single signal line corresponding to the decoded module number among the data/address bus 122 is driven at a "L"ow level.

In this embodiment, the outputs of gates 136, which are connected to corresponding data lines among the address/data bus 122 as noted above, are pulled up by pull up resistors Ri (only one of which is shown in FIG. 7) in the central controller circuit 90.

Further, all of the data lines are connected to the interrupt destination module number arbitration circuit 144. The interrupt destination module number arbitration circuit 144 watches the status of all of the data lines during the interrupt destination notifying cycle and selects a single destination module number by means of a predetermined conventional arbitration method. The interrupt destination module number arbitration circuit 144 latches the module number at the end of the interrupt destination module number notifying cycle.

The interrupt destination module number arbitration circuit 144 has a parallel output which is applied to the interrupt source module number comparing circuit 140 and the interrupt destination module number comparing circuit 156 via parallel signal lines 142.

The interrupt source module number comparing circuit 140 further receives the output of the interrupt destination module number holder circuit 130. If the arbitrated destination module number and the held destination module number are the same number, the interrupt source module number comparing circuit 140 outputs a "H"igh level signal to the AND gate 148.

The interrupt destination module number comparing circuit 156 receives a predetermined module number from the CPU 68 via parallel signal lines 152. This module number is the unique module ID number and is applied constantly on parallel signal lines 152 from the CPU 68. The interrupt destination module number comparing circuit 156 outputs a "H"igh level signal when the fixed module number and the arbitrated module number from the interrupt destination module number arbitration circuit 144 are the same number.

Further, the other output of the interrupt transfer cycle detector circuit 110 is applied to an input of the AND gate 148 and an input of the AND gate 158. The input signal applied to the AND gate 148 drives an enable input EN of the interrupt source module number decoder circuit 146 and the other applied input signal to the AND gate 158 drives the interrupt source module number latch circuit 160.

The AND gate 148 is further driven by an output from the interrupt source module number comparing circuit 140 and an output from the interrupt signal holder circuit 104. The AND gate 158 is also driven by an output from the interrupt destination module number comparing circuit 156.

The module ID number from the parallel signal lines 152 is also applied to an input of the interrupt source module number decoder circuit 146. In the interrupt source module number notifying cycle, the interrupt source module number decoder circuit 146 selects a signal line which corresponds to the received module ID number. The output of the interrupt source module number decoder circuit 146 is driven by a corresponding open collector output gate 150 and, as a result, drives one of the data lines among the data/address bus 122.

Each of the data lines among the data/address bus 122 is connected to an input of the interrupt source module number latch circuit 160. The interrupt source module number latch circuit 160 detects at least one interrupt on the bus 122 and outputs an interrupt signal on an interrupt line 162 to notify the CPU 68 of the interrupt. Further, the interrupt source module number latch circuit 160 latches the status of the bus 122 and outputs the module number to the parallel signal lines 164.

An interrupt reset signal from the CPU 68 comes from an interrupt signal line 168 to the common interrupt reset signal line 120 via an open collector type output gate 166. The interrupt reset signal is also applied to a reset input of the interrupt source module number latch circuit 160.

As a result, the interrupt reset signal is applied to one input of the OR gate 176 in FIG. 7 through a pull up resistor R3. The other input of the OR gate 176 is connected to an interrupt reset signal line 178 in the interrupt detector/arbiter circuit (not shown) in the CPU module 78. The OR gate 176 can be driven by either of the interrupt reset signals.

(Operations)

The operation of the embodiment of the present invention as described above will now be explained in detail using FIG. 8 and FIG. 9.

Figure 9:
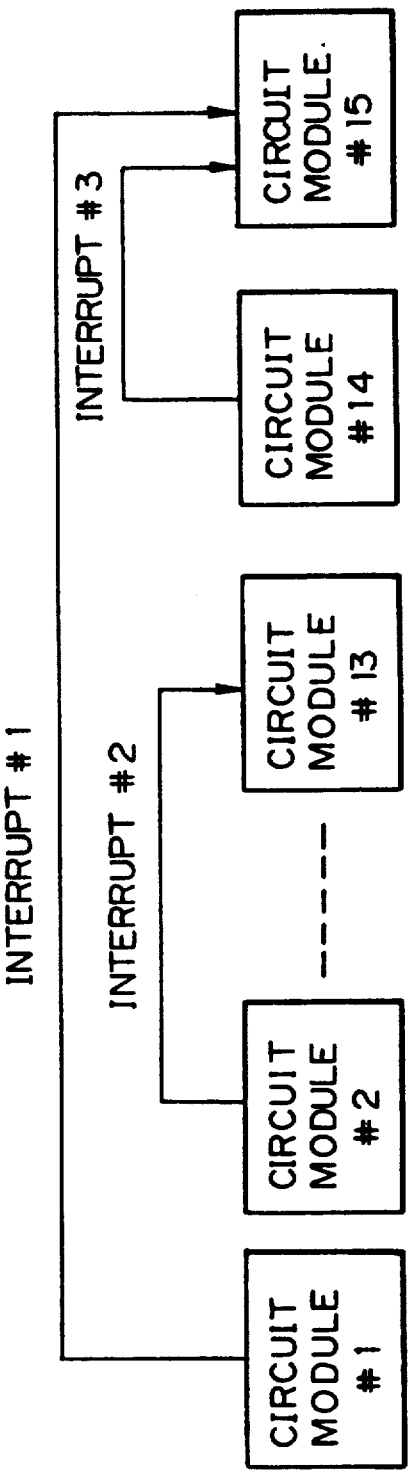
FIG. 9 is a drawing for explaining an example of operation of the embodiment of the invention.

As shown in FIG. 9, assume that there are 15 circuit modules of the present invention, including the above mentioned communication control module 50, which are connected to a CPU module 78 (#0; not shown) via the common bus 52. Each of these circuit modules has the interrupt detector/arbiter circuit 64. Further, assume that a circuit module #1 makes an interrupt #1 to a circuit module #15 and, at the same timing, a circuit module #14 makes an interrupt #3 to the circuit module #15 and a circuit module #2 makes an interrupt #2 to a circuit module #13.

Figure 8:
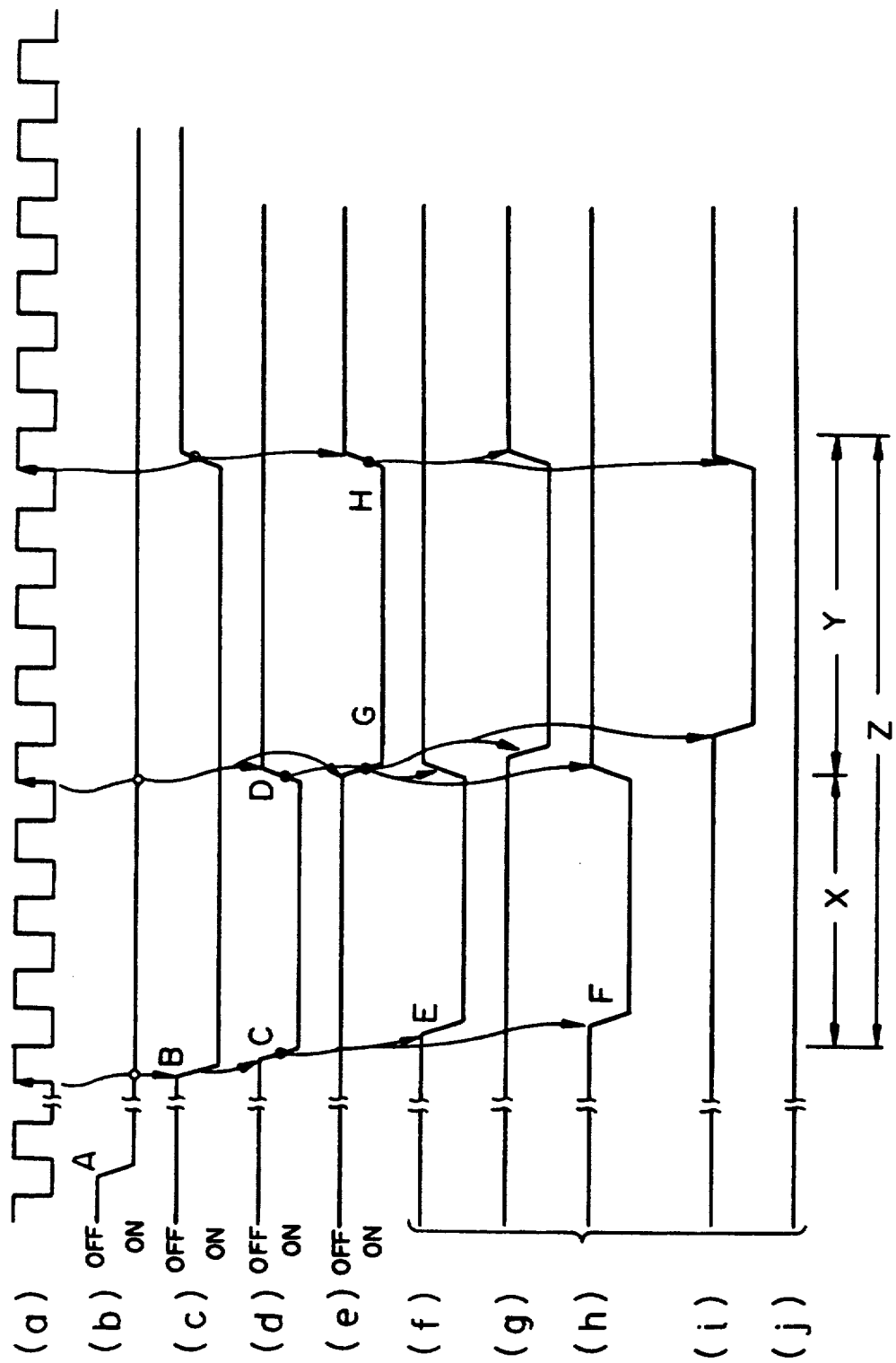
FIG. 8 is a timing chart of the embodiment illustrated in FIG. 6 and FIG. 7 during the interrupt detection/arbitration operation.

In FIG. 8, row (a) represents the bus clock signal provided by the bus clock generator circuit 184, row (b) represents a signal status on the common interrupt signal line 118, row (c) represents a signal status on the common control signal line 114, and row (d) represents a signal status on the output line 108 of the interrupt transfer cycle detector circuit 110.

Row (e) in FIG. 8 represents a signal status on the other output signal line 132 of the interrupt transfer cycle detector circuit 110. Rows (f), (g), (h), (i), and (j) represent the signal status of each of the assigned data lines of circuit modules #5, π14, #13, #2, and #1, respectively.

In FIG. 8, X represents the interval of the interrupt destination notifying cycle, Y represents the interval of the interrupt source module notifying cycle, and represents the complete interrupt transfer cycle. Further, assume that all of the circuit modules except the CPU module (#0) have substantially the same circuit structure as that of the communication control module disclosed in FIG. 4 and FIG. 6.

At first, when any of the circuit modules make an interrupt, the CPU 68 drives the output gate 112 and makes the common interrupt signal line 118 "ON" or "L"ow level (timing A of the status signal shown in row (b)). As mentioned above, the common interrupt signal line 118 is driven by negative logic.

Further, this status is transferred to the AND gate 170. Since the initial state of the output of the interrupt transfer cycle request mask circuit 174 is "L"ow level, AND gate 170 outputs an "ON" or "H"igh level signal. The "ON" signal drives the interrupt cycle request circuit 180. The output of the interrupt cycle request circuit 180 drives the cycle generator circuit 182, which generates an "ON" or "L"ow level signal according to the bus clock signal from the bus clock generator circuit 184 (timing B of the status signal shown in row (c)). This is the start of the interrupt transfer cycle Z.

The interrupt transfer cycle detector circuits 110 in all of the circuit modules #0, #1, ... #14, and #15 receive the "L"ow level output of the cycle generator circuit 182 via the common control line 114. Each interrupt transfer cycle detector circuit 110 outputs an "ON" or "L"ow level signal and maintains the status of the output line 108 for a predetermined interval. In this example, the status of each line 108 is maintained at a "L"ow level for four bus clock pulses (timing C to D of the status signal shown in row (d)).

When the output line 108 becomes "ON" or "L"ow level, the output of the AND gate 106 is applied to the enable input EN of the interrupt destination module number decoder 134 if the original interrupt signal is held at the interrupt signal holder circuit 104.

Therefore, only the circuit module whose interrupt signal holder circuit 104 maintains the "ON" or "H"igh level status can drive the interrupt destination module number decoder circuit 134. As mentioned above, the destination module number is constantly applied to the interrupt destination module number decoder circuit 134 from the interrupt destination module number holder circuit 130. The interrupt destination module number decoder circuit 134 selects an assigned single output gate among the output gates 136. The selected output gate outputs an "ON" or "L"ow level signal.

As a result, only the data lines among the data/address bus 122 of the circuit modules #15 and #13 become "L"ow level (timing E of the status signal shown in row (f) and timing F of the status signal shown in row (h)).

Further, in the circuit modules whose interrupt transfer cycle detector circuits 110 output the "ON" or "H"igh level signal on the output line 108, the interrupt destination module number arbiter circuit 144 is enabled by the "ON" or "H"igh level signal from the output line 108.

The interrupt destination module number arbiter circuit 144 watches the status of the data lines among the data/address bus 122 and arbitrates interrupts. In this embodiment, a predetermined priority is assigned to each of the data lines, for example, MSB priority for each of the data lines.

Therefore, if a plurality of interrupts having a predetermined timing relationship occur, the result of the arbitration is always unique. Further, the results of the arbitration in the circuit modules which requested an interrupt are always same.

In this embodiment, the interrupt destination module number arbiter circuit 144 selects module number #15 as the destination module number according to the arbitration logic. The selected module number #15 is outputted to the interrupt source module number comparing circuit 140 via the parallel output lines 142. If the arbitrated module number (#15) and an output from the interrupt destination module number holder circuit 130 are the same module number, the interrupt source module number comparing circuit 140 outputs a "H" level signal. In this example the interrupt source module number comparing circuits 140 in the circuit modules #1 and #14 output the "H"igh level signal.

Further, the interrupt transfer cycle detector circuit 110 drives the AND gate 148 via the output line 132 for a predetermined interval. In this embodiment, the output line 132 is driven at "L"ow level during four bus clock pulses (timing G to H in the status signal shown in row (e)).

During this interval, as a result, the AND gate 148 drives the interrupt source module number decoder circuit 146 via the enable input EN. The enabled interrupt source module number decoder circuit 146 receives the unique module ID number via the parallel signal lines 152 and selects a corresponding output gate among a plurality of output gates 150 which are connected to respective data lines among the data/address bus 122. In this example, data lines #14 (row (g)) and #1 (row (j)), are driven at "L"ow level.

The interrupt source module number latch circuit 160 is driven by the output from the interrupt destination module number comparing circuit 156 and the output from the interrupt transfer cycle detector circuit 110 via the AND gate 158. The interrupt source module number latch circuit 160 is enabled only in a circuit module whose module ID number is equal to the arbitrated interrupt destination module number.

The interrupt source module number latch circuit 160 notifies the CPU 68 of the start of latching by a signal on line 162 and sends the latched information to the CPU 68 via parallel signal lines 164. As a result, the CPU 68 (in the circuit module #15) which has received the arbitrated interrupt recognizes (detects) the circuit modules that originated the interrupt.

After that, the CPU 68 in the circuit module #15 can detect that the circuit modules #1 and #14 have made interrupts. Therefore, the CPU 68 in the circuit module #15 will be able to execute necessary operations as to those interrupts; for example, reading registers (not shown) in the circuit modules #1 and #14, or transferring data from each of memories of the circuit modules #1 and #14. Further the CPU 68 in the circuit module #15 generates an interrupt reset signal on the signal line 168 to reset the interrupt transfer cycle request mask circuit 174 in the CPU module (#0; not shown) 78 to allow the CPU module to accept the next interrupt transfer cycle.

Therefore, according to the present invention, the load on the main CPU 92 in the CPU module 78 is reduced. Further, merely by adding an interrupt detector/arbiter circuit 64, the CPU module 78 itself can be an interrupt source/destination circuit module.

What is claimed is:

1. An apparatus for interrupt detection and arbitration in a system which includes a plurality of circuit modules connected to each other by a common bus, said apparatus comprising:
   (a) means provided in at lest one of the circuit modules for detecting an interrupt signal on the common bus and generating an interrupt transfer cycle;
   (b) means provided in the circuit modules for applying the interrupt signal to the common bus, said interrupt signal being generated in at least one of the circuit modules;
   (c) means responsive to the start of the interrupt transfer cycle for dividing the interrupt transfer cycle into an interrupt destination notifying cycle and a succeeding interrupt source notifying cycle;
   (d) means responsive to the interrupt destination notifying cycle for applying information identifying at least one destination circuit module on the common bus;
   (e) means for arbitrating the information applied on the common bus if a plurality of destination circuit modules are identified, and for selecting a single one of them as an arbitrated destination circuit module;
   (f) means responsive to the interrupt source notifying cycle for applying on the common bus information identifying at least one interrupt source circuit module that identified the arbitrated destination circuit module during the interrupt destination notifying cycle; and
   (g) means provided in the arbitrated destination circuit module for accepting the information identifying the at least one interrupt source circuit module.

2. An apparatus for interrupt detection and arbitration in a system which includes a CPU module and a plurality of additional circuit modules connected to each other by a common bus, said apparatus comprising:
   (a) a plurality of interrupt detector/arbiter circuits, each interrupt detector/arbiter circuit being provided in a respective one of the additional circuit modules and including
      (a-1) means for transferring an interrupt signal generated by the respective additional circuit module to the common bus;
      (a-2) means for driving an assigned line in the common bus in response to a first control signal on the common bus, the assigned line corresponding to a signal which is generated by the respective additional circuit module and which identifies another additional circuit module as an interrupt destination circuit module;
      (a-3) means for latching the status of the common bus to detect the driven lines and the corresponding interrupt destination circuit modules, said latching means further arbitrating the detected interrupt destination circuit modules and outputting an arbitration result which identifies a selected interrupt destination circuit module;

(a-4) means for comparing the result of the arbitration and said signal which is generated by the respective additional circuit module and which identifies another additional circuit module as an interrupt destination circuit module, said comparing means outputting a second control signal if the arbitration result and said signal which is generated by the respective additional circuit module and which identifies another additional circuit module as an interrupt destination circuit module are the same;

(a-5) means responsive to the second control signal for driving a signal line among the common bus corresponding to a a signal identifying the respective additional circuit module;

(a-6) means for comparing the signal identifying the respective additional circuit module and the result of the arbitration, said comparing means outputting a third control signal if the respective additional circuit module and the result of the arbitration are the same; and (a-7) means responsive to the third control signal for latching the status of the common bus to identify additional circuit modules which have made interrupts to the respective additional circuit module; and (b) a central controller circuit in the CPU module of the system, the central control circuit including means for detecting the interrupt signal on the common bus and generating the first control signal on the common bus in a predetermined interval.

3. An apparatus for interrupt detection and arbitration in a system which includes a plurality of circuit modules connected to each other by a common bus, said apparatus comprising:

(a) a plurality of interrupt detector/arbiter circuits, each interrupt detector/arbiter circuit being provided in a respective circuit module and including (a-1) means for transferring an interrupt signal generated by the respective circuit module to the common bus;

(a-2) means for driving an assigned line in the common bus in response to a first control signal on the common bus, the assigned line corresponding to a signal which is generated by the respective circuit module and which identifies another circuit module as an interrupt destination circuit module;

(a-3) means for latching the status of the common bus to detect the driven lines and the corresponding interrupt destination circuit modules, said latching means further arbitrating the detected interrupt destination circuit modules and outputting an arbitration result which identifies a selected interrupt destination circuit module;

(a-4) means for comparing the result of the arbitration and said signal which is generated by the respective circuit module and which identifies another circuit module as an interrupt destination circuit module, said comparing means outputting a second control signal if the arbitration result and said signal which is generated by the respective circuit module and which identifies another circuit module as an interrupt destination circuit module are the same;

(a-5) means responsive to the second control signal for driving a signal line among the common bus corresponding to a signal identifying the respective circuit module;

(a-6) means for comparing the signal identifying the respective circuit module and the result of the arbitration, said comparing means outputting a third control signal if the respective circuit module and the result of the arbitration are the same; and (a-7) means responsive to the third control signal for latching the status of the common bus to identify circuit modules which have made interrupts to the respective circuit module; and (b) a central controller circuit provided in at least one of the circuit modules of the system, the central controller circuit including means for detecting the interrupt signal on the common bus and generating the first control signal on the common bus in a predetermined interval.

* * * * *